Sept. 4, 1956

G. E. COHEE 2,761,581

CARGO CONTAINER

Filed Jan. 31, 1952

INVENTOR.
GEORGE E. COHEE
BY
Campbell, Brumbaugh, Free & Graves
HIS ATTORNEYS.

Sept. 4, 1956 G. E. COHEE 2,761,581
CARGO CONTAINER
Filed Jan. 31, 1952 2 Sheets-Sheet 2
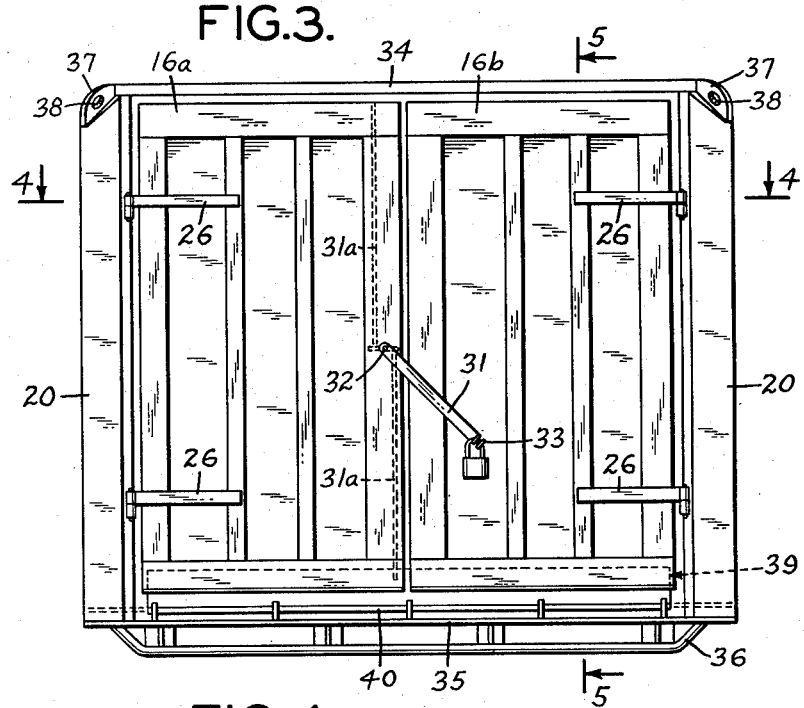
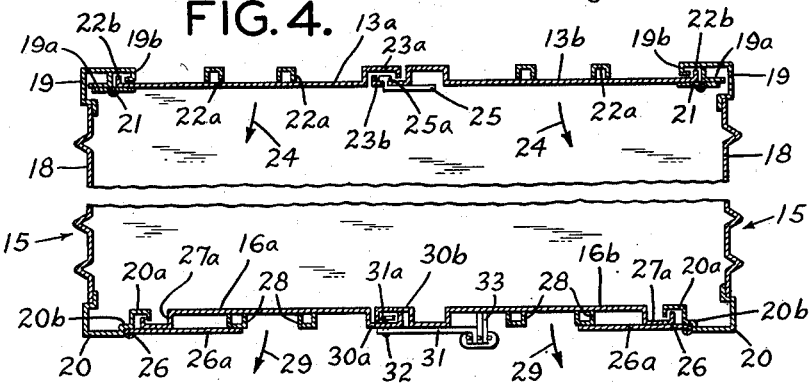
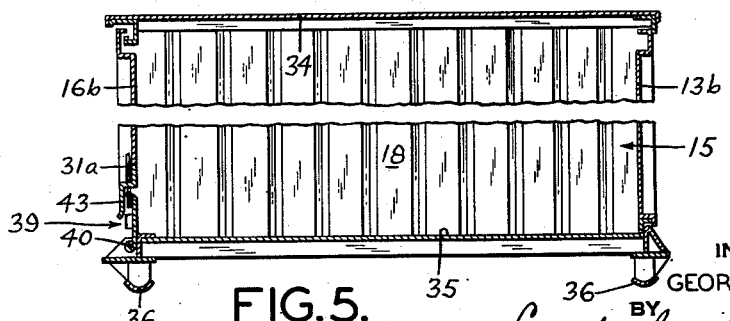
INVENTOR.
GEORGE E. COHEE
BY
HIS ATTORNEYS.

United States Patent Office 2,761,581
Patented Sept. 4, 1956

2,761,581

CARGO CONTAINER

George E. Cohee, Jenkintown, Pa., assignor, by mesne assignments, of one-half to Eastern Steamship Lines Inc., Boston, Mass., a corporation of Maine, and one-half to American-Hawaiian Steamship Company, New York, N. Y., a corporation of New Jersey Application January 31, 1952, Serial No. 269,152

5 Claims. (Cl. 220—1.5)

This invention relates to cargo containers and more particularly to methods and apparatus whereby a string of individual cargo containers may be cooperatively loaded but individually sealed.

In the transportation of cargo by a series of carriers of different types such, for example, as by truck to ship and to truck, or simply from one truck to another, it is the common practice to unload and reload the cargo at each transfer point in a series of separate handling operations. The expenses incurred in this multiple handling of the cargo may represent a large proportion of the total shipping cost. Further, there is considerable opportunity for the cargo to sustain damage.

In a typical transport operation, for example, a cargo is loaded into a truck, the truck sealed and the cargo hauled to a first transfer point. The cargo is then unloaded, to await the next carrier. In the case of a fragile cargo comprised of a large number of small items, the unloading operation may take considerable time and delay the truck. Frequently the loose cargo must be stacked on a guarded dock or in a warehouse awaiting reloading into the next carrier. This process continues until the ultimate destination is reached and each stage of the operation both exposes the cargo to damage and entails additional handling costs.

It is, accordingly, an object of the present invention to provide new and improved methods and apparatus for facilitating the economical and efficient handling of cargo, particularly cargo which must be transported by a succession of different carriers.

It is another object of the invention to provide an improved container apparatus whereby a plurality of individual containers may be effectively integrated as a single unit for purposes of loading.

It is another object of the invention to provide improved cargo containers, a string of which may be integrated as a single unit for purposes of loading but each of which may be individually sealed off as soon as it is loaded without destroying the integration of the remaining unloaded containers of the string.

It is another object of the invention to provide a new and improved standardized container which may, while loaded, be transferred from one carrier to another, thereby shielding the cargo from damage at all times and obviating the need for costly individual protective wrappings for the items comprising the cargo.

A still further object of the invention is to provide apparatus and methods for cargo carriage which afford unusual flexibility in the handling and transportation of cargo.

Still another object of the invention is to provide new and improved cargo containers, a plurality of which may be quickly and effectively integrated as a single unit affording through-way means between adjoining containers to enable conventional cargo loading devices, such as fork trucks, dollies and the like to be easily plied between containers.

These and other features and objects may be attained according to the invention by the provision of cargo accommodating containers, each of which is formed with front and back door means. The front and back door means are designed differently, so that when two of the containers are abutted back to front, the then opposing door means may both be opened into one container. To this end, the invention contemplates, for example, cooperative front and rear door means, the former opening outwardly and the latter opening inwardly and the two being respectively dimensioned and mounted to facilitate the nesting of one within the other. Any number of units may be lined up in series and, with all opposed door means opened in mating assembly, as described, a large integrated cargo carrying area is provided. As the individual containers are loaded through the front end of the string, the most remote container being loaded first, the front door means of the loaded container may be closed and externally locked, thereby in effect detaching that container from the integrated string. The back door means of the next container to be loaded is then closed and latched from within and the loading process continued to the end of the string.

At any point of discharge for cargo any one container in the string may be removed, regardless of its position in the string, without disturbing the remaining units or cargoes therein in any way. To facilitate handling of the individual containers suitable hook accommodating pads may be attached to the upper surface and skid means may be affixed to the underside.

To afford more convenient passage between successive units, a hinged flap may be provided along the bottom edge of door means of each container which may be swung into position to afford a roadway over which fork trucks, dollies and the like may be easily wheeled without obstruction at the joint between containers.

The invention may be better understood by reference to the following specification disclosing preferred embodiments thereof, and taken in conjunction with the accompanying drawings in which:

Fig. 3 is an end view of a container showing, externally, the front door means thereof;

Fig. 4 is a foreshortened view in transverse section taken at the horizontal plane through the line 4—4 of Fig. 3, looking in the direction of the arrows and showing particularly, the front and back door means of a container;

Fig. 5 is a foreshortened view taken at the vertical plane through the line 5—5 of Fig. 3 looking in the direction of the arrows.

Figure 1:
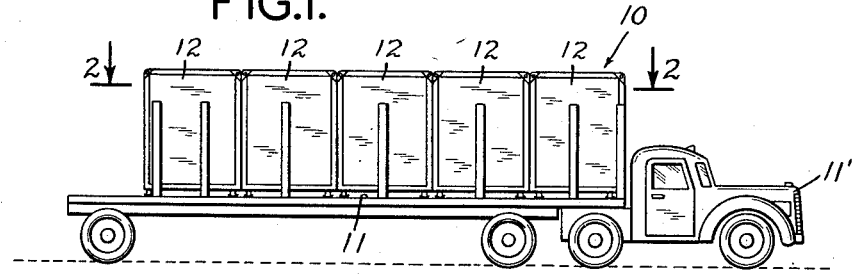
Fig. 1 is a side view of a carrier vehicle on which a string of cargo containers has been mounted.
Figure 2:
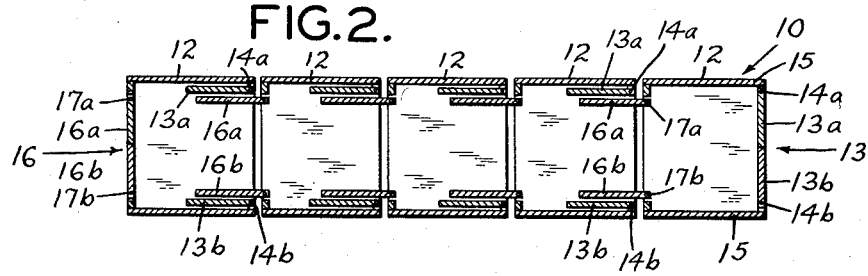
Fig. 2 is a view in section taken on the horizontal plane through the line 2—2 of Fig. 1 looking in the direction of the arrows.

Referring to Figs. 1 and 2 of the drawing, the invention is illustrated as embodied in a cargo carrying assembly 10 mounted on the platform 11 of a truck 11'. The cargo carrying assembly 10 comprises a plurality of containers 12 abutted front to back in a string and which may be integrated, as best seen in the schematic diagram of Fig. 2, to afford a single, enlarged cargo carrying area. The containers 12 comprise individually sealable units, the back walls (facing the forward end of the truck) of which are fitted with a back door means 13, preferably comprising a pair of inwardly swinging doors 13a and 13b which are hinged on vertical axes 14a and 14b, respectively, disposed closely adjacent side walls 15. The front walls are fitted with a front door means 16, preferably comprising a pair of outwardly swinging doors 16a and 16b hinged on vertical axes 17a and 17b, respectively, spaced inwardly from the side walls 15. The door means 13 and 16 are so dimensioned and hinged relatively to one another that the outwardly opening front door means 16 of a forward container may be opened or nested into the inwardly opened back door means 13 of the next following container, thereby affording a through-way between the successive containers.

Any number of containers 12 may be used in the string, the number shown in the embodiment of the invention as illustrated in Fig. 1 being dependent upon the length of the platform 11.

The successive containers 12 are loaded starting with the most remote container, which is disposed at the right hand end of the string as viewed in the drawing. This container is entered through the front door means 16 of the front container, which is at the left hand end of the string as viewed in the drawing, and through the empty intermediate containers, the respective door means 13 and 16 of which are opened. After the end container is loaded, the front door means 16 thereof is closed and, if desired, locked externally. The back door means 13 of the next adjacent container of the string is then closed and, if desired, sealed from within. That container may then be loaded with cargo, after which the next set of nesting door means 13 and 16, respectively, are closed to seal off the second container and to prepare the third for loading. This process may continue until each container of the string is loaded. At the completion of the loading operation a series of abutted containers will be disposed on the platform of the truck, any one of which may be removed without disturbing the remaining containers or the cargoes therein. The truck 11 may then proceed on its journey leaving the designated containers at various points in the itinerary, or in the event the cargo is to continue by water transport, the containers may be conveniently and individually loaded into the hold of a ship without necessitating any handling whatsoever of the cargoes within the containers.

Referring to Figs. 3 through 5, the construction of a preferred form of container is shown, the side walls 15 thereof comprising ribbed or corrugated side panels 18, which may be formed of stamped sheet metal, for example, attached as by welding to pairs of shaped corner or upright members 19 and 20. The corresponding upright members 19 are each formed with inturned or reentrant flange portions 19a to which strap hinges 21 are attached. The hinges 21 carry the inwardly opening back door portions 13a and 13b. If desired, reinforcing ribs 22a may be affixed to the door portions to afford rigidity.

Each upright member 19 is formed with a reentrant flange 19b which mates with a forwardly extending flange 22b formed on the door portions 13a and 13b to provide a weathertight seal. The two door portions 13a and 13b, which are adapted to be swung inwardly as indicated by the arrows 24 in Fig. 4, are identical in design with the exception, of course, of their engaging edges, the edge of the door portion 13a being formed with an inwardly facing channel 23a to receive an outwardly facing channel 23b formed at the edge of the door portion 13b. A suitable internal latch 25 is provided to lock the door portions in closed position. Catch linkage 25a may be provided to anchor the doors at top and bottom.

The outwardly opening front doors 16a and 16b at the front end of the container are supported by hinges 26 attached to the upright corner members 20. The hinging axes of the hinges 26 are disposed inwardly away from the side walls 18 so that the total horizontal spacing of the axes of the hinges 26 is slightly less than the horizontal spacing between the axes of the hinges 21 of the back doors 13a and 13b. The doors 16a and 16b are formed at their hinging edges with inwardly facing vertical channel portions 27a, respectively, which mate with corresponding outwardly facing portions 20a formed integrally with the corner upright members 20. The doors 16a and 16b are preferably strengthened with reinforcing ribs 28 and inner strap portions 26a of the hinges 26 are attached to one of the ribs 28 and to the outermost surfaces of the channel portions 27a. Preferably, the hinges 26 are seated in a recess 20b formed in the upright member 20.

The doors 16a and 16b, which open outwardly in the direction indicated by the arrows 29, are substantially identical with the exception that the free edge of the door 16a is formed with an inwardly facing channel 30a which mates with a corresponding outwardly facing channel 30b formed at the free edge of the door 16b. A latch device 31 may be provided as a lock for the doors, the latch 31 being pivoted at 32 to the channel 30a of the door 16a and adapted to engage a lug 33 affixed to the door 16b. Holes may be provided in the latch and lug for receiving a padlock. Preferably, this latch mechanism includes catch linkage 31a for securing the doors top and bottom.

The container also comprises a rib-reinforced roof portion 34, as best seen in Fig. 5, attached to the side walls 18 and corner members 19 and 20, and a rib-reinforced floor portion 35, also attached to the side walls 18 and corner members 19 and 20. Attached to the under side of the floor portion 35 beneath the uprights 19 and 20 are a pair of transverse runners or skids 36 upon which the containers rest and by means of which they may be moved without lifting. To facilitate lifting of the containers four upper corners are obliquely beveled and lifting pads 37 are attached thereto, the pads being formed with eyes 38 for receiving hooks or cables.

Figure 6:
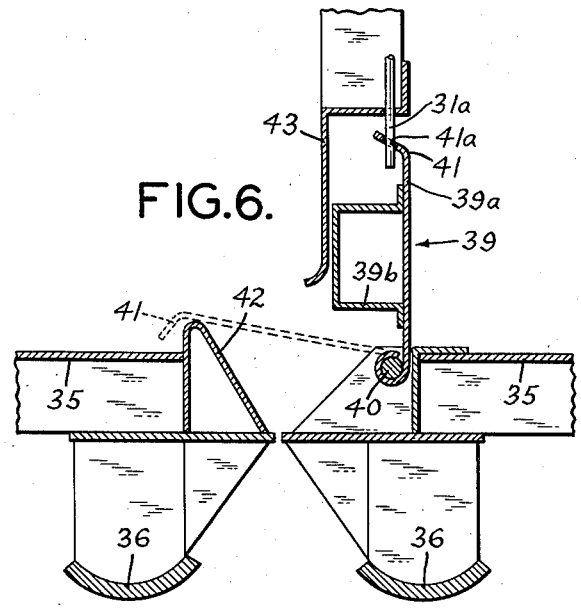
Fig. 6 is an enlarged fragmentary view in vertical section showing the lower abutted edges of two abutted containers and illustrating the bridging or roadway portion for affording smooth passage between adjoining containers.

To facilitate passage between containers when the doors are opened in the manner illustrated in Fig. 2, a bridging flap 39, as best seen in Figs. 3, 5 and 6, may be provided at the base of the outwardly opening doors 16a and 16b. This flap, comprising a rectangular plate member 39a reinforced with a rib 39b, may be hinged on a horizontal axis 40 disposed in the plane of the container floor 35. The free edge of the flap 39 is formed with a curved lip 41 adapted to overhang an abutment 42 which is attached to the back end of the adjacent container. The lower end of the doors 16a and 16b are formed with depending skirt portions 43 which are adapted to engage the bottom of the rib 39b on the under side of the flap when the doors are closed and the bridging flap is swung upwardly. In this closed position the catch linkage 31a is received in an opening 41a in the flap 39. When the doors 16a and 16b are swung outwardly the flap 39 may be swung down to a horizontal position to rest on the abutment 42, thereby providing a bridge between abutted units over which fork trucks, dollies and the like may readily pass.

The particular form of the invention herein described and illustrated in the accompanying drawings is presented merely to show how the invention may be applied. Other forms, embodiments and applications of the invention coming within the proper scope of the appended claims will readily suggest themselves to those skilled in the art. The invention should not be limited, therefore, except as it is defined in the following claims.

I claim:

1. A cargo container adapted to be separably integrated with like cargo containers, comprising a hollow container having front and back walls, means defining substantially aligned openings respectively in the front and back walls thereof front and back door means mounted respectively in said openings and adapted to be opened outwardly and inwardly, respectively, said outwardly opening front door means being smaller than said inwardly opening back door means and of such shape, proportions and relative location with respect to the back door means as to be openable outwardly into inwardly opened back door means of a corresponding container, whereby two or more of said containers may be abutted front to back in a string with oposing front and back openings in alignment and with corresponding front and back door means of contiguous containers being adapted to be opened to form a through-way therebetween, the front door means of the forward container being adapted to nest within the inwardly opened back door means of the following container.

2. A cargo container adapted to be separably integrated with a like cargo container, comprising a hollow container having front and back walls, means defining substantially aligned openings respectively in the front and back walls thereof front and back door means mounted respectively in said openings and adapted to be opened outwardly and inwardly, respectively, said outwardly opening front door means being smaller than said inwardly opening back door means, and of such shape, proportions and relative location with respect to the back door means as to be openable outwardly into inwardly opened back door means of a corresponding container whereby two or more of said containers may be abutted front to back in a string with opposing front and back openings in alignment and with corresponding front and back door means of contiguous containers being adapted to be opened to form a through-way therebetween, the front door means of the second container being adapted to nest within the inwardly opened back door means of the foremost container, and a bridging member pivoted on a horizontal axis adjacent the said front door means and adapted to be swung between an inoperative position in a vertical plane and an operative position in a horizontal plane affording a bridging surface between abutted, integrated containers, said bridging member being held in its inoperative position by said front door means.

3. A cargo container adapted to be separably integrated with a like cargo container, comprising a hollow container having front and back walls, means defining substantially aligned openings respectively in the front and back walls thereof front door means mounted in one of the openings and including a pair of doors hingedly attached at their outer vertical edges to the container and adapted to be opened outwardly, the hinging axes being spaced apart by a given distance, and back door means mounted in the other of said openings and including a pair of doors hingedly attached at their outer vertical edges to said container and adapted to be opened inwardly, the hinging axes of the front door means being spaced apart a distance less than the spacing of the hinging axes of the back door means, said front and back pairs of doors being relatively positioned and dimensioned whereby two of the containers may be abutted front to back with the corresponding front and back openings in alignment and the respective opposed front and back doors opened into one of the containers to afford a passageway between the containers.

4. A cargo container adapted to be separably integrated with a like cargo container, comprising a hollow container having front and back walls, means defining substantially aligned openings respectively in the front and back walls thereof front door means mounted in one of the openings and including a pair of doors hingedly attached at their outer vertical edges to the container and adapted to be opened outwardly, the hinging axes being spaced apart by a given distance, back door means mounted in the other of said openings and including a pair of doors hingedly attached at their outer vertical edges to said container and adapted to be opened inwardly, the hinging axes of the front door means being spaced apart a distance less than the spacing of the hinging axes of the back door means, said front and back pairs of doors being relatively positioned and dimensioned whereby two of the containers may be abutted front to back with the corresponding front and back openings in alignment and the respective opposed front and back doors opened into one of the containers to afford a passageway between the containers, externally operable latching means for said front door means, and a bridging member pivotally mounted on a horizontal axis adjacent said front door means, said bridging member being adapted to be swung between an inoperative position in a vertical plane and an operative position in a horizontal plane, the free edge of said member being adapted to rest on an adjacent container to afford a bridging surface therebetween, said bridging member being adapted to be held in its inoperative position by closing the front door means.

5. A cargo container as set forth in claim 4 the upper end of said container being beveled at its corners and lifting members attached to the container at said bevels, whereby a container may be lifted from a string of abutted containers.

References Cited in the file of this patent

UNITED STATES PATENTS

| | | |
|---|---|---|
| 1,667,467 | Young | Apr. 24, 1928 |
| 1,694,912 | Fitch | Dec. 11, 1928 |
| 1,760,842 | Greenwood | May 27, 1930 |
| 1,783,363 | Grob | Dec. 2, 1930 |
| 1,942,022 | Faries | Jan. 2, 1934 |
| 2,137,255 | Tuttle | Nov. 22, 1938 |
| 2,247,340 | Webster | June 24, 1941 |